Dec. 30, 1958  R. KUSSMAUL  2,866,312
EXPANSIBLE LINKAGE WITH DETACHABLE LINKS
Filed Sept. 24, 1956  4 Sheets-Sheet 1
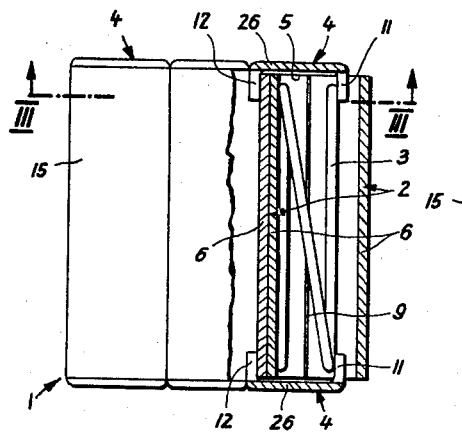
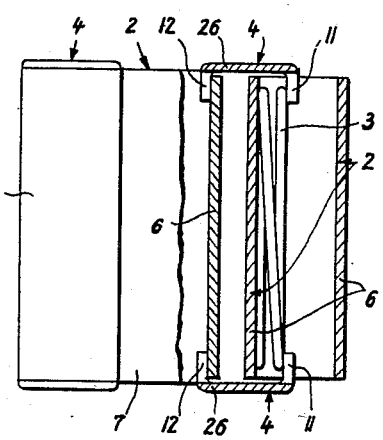
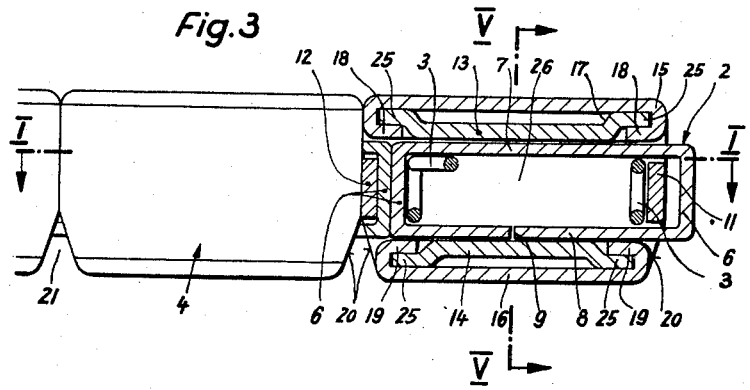
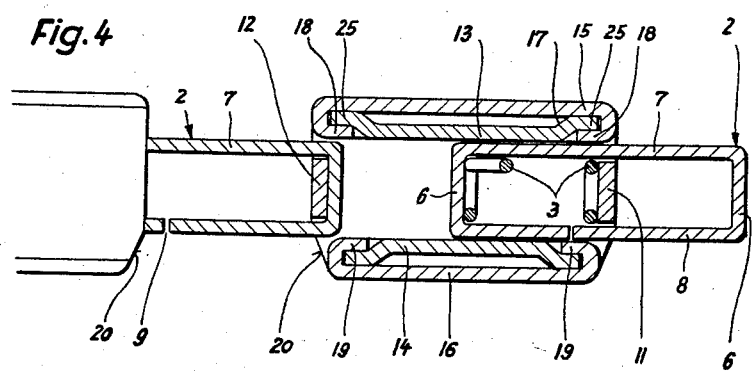
INVENTOR.
Reinhold Kussmaul
BY
Bailey, Stephens & Huettig
Attorneys Dec. 30, 1958 R. KUSSMAUL 2,866,312
EXPANSIBLE LINKAGE WITH DETACHABLE LINKS
Filed Sept. 24, 1956 4 Sheets-Sheet 2
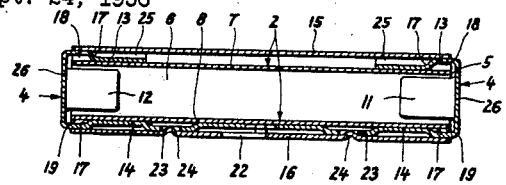
Fig. 5
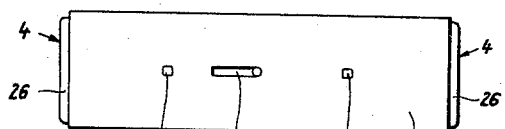
Fig. 6
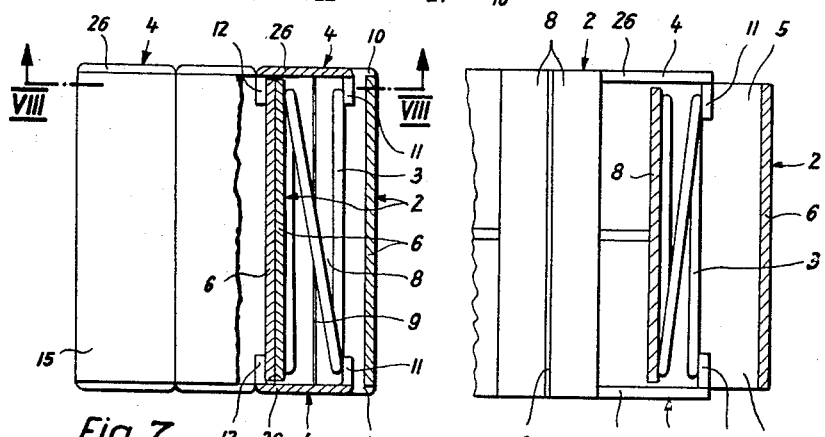
Fig. 7
Fig. 10
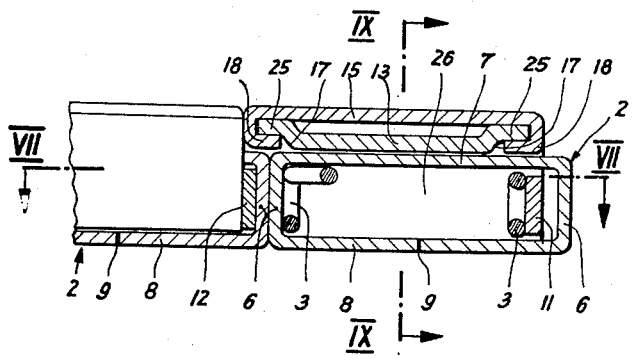
Fig. 8
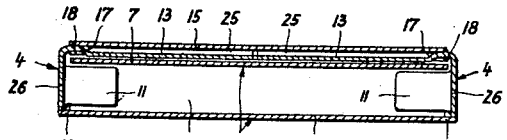
Fig. 9
INVENTOR.
Reinhold Kussmaul
BY
Bailey, Stephens and Huettig
Attorneys Dec. 30, 1958 R. KUSSMAUL 2,866,312
EXPANSIBLE LINKAGE WITH DETACHABLE LINKS
Filed Sept. 24, 1956 4 Sheets-Sheet 3

INVENTOR.
Reinhold Kussmaul
BY
Bailey, Stephens & Huettig
Attorneys

Dec. 30, 1958 R. KUSSMAUL 2,866,312
EXPANSIBLE LINKAGE WITH DETACHABLE LINKS
Filed Sept. 24, 1956 4 Sheets-Sheet 4
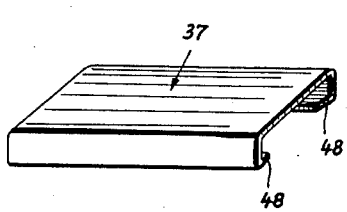
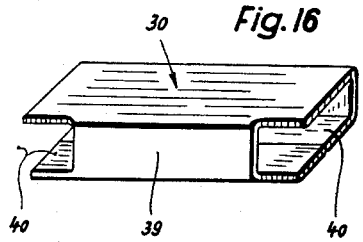
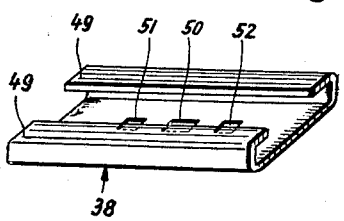
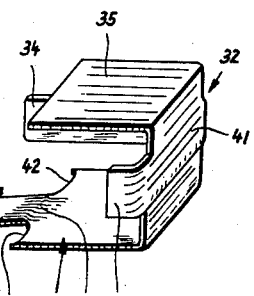
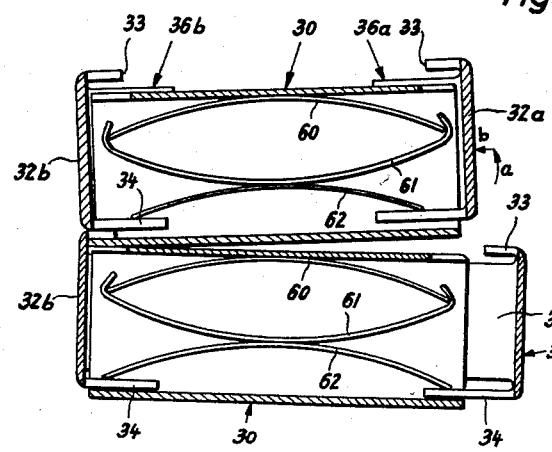
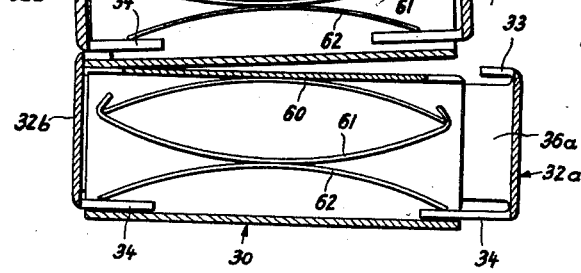
INVENTOR.
Reinhold Kussmaul
BY
Bailey Stephens & Huttig
Attorneys

United States Patent Office 2,866,312
Patented Dec. 30, 1958

2,866,312

EXPANSIBLE LINKAGE WITH DETACHABLE LINKS

Reinhold Kussmaul, Pforzheim, Baden, Germany, assignor to Kollmar & Jourdan, Aktiengesellschaft, Pforzheim, Baden, Germany Application September 24, 1956, Serial No. 611,657

Claims priority, application Germany September 28, 1955

20 Claims. (Cl. 59—79)

The present invention relates to an elastic link strap for ornamental and utilitarian purposes, and particularly for use as a watch strap or bracelet.

More particularly, the present invention relates to an elastic link strap of the type consisting of a plurality of substantially rectangular hollow tubular links which are disposed parallel to each other and transverse to the longitudinal direction of the strap, and each of which contains at least one spring, and which are connected with each other by connecting members, each of which encloses both the outer ends of one tubular link and the spring in the adjacent tubular link so as to tension such spring when the strap is being expanded.

All of the elastic straps of this type as known prior to this invention have, however, the disadvantage that neither in the released, nor in the expanded position of the strap, will they give a fully enclosed and unitary appearance. Particularly in the expanded position, these prior straps were either open at their lower side and then no longer had a continuous supporting surface facing toward the arm of the user, which thus tended to grip and pinch the skin and hairs on the arm between adjacent links, or they were open at their upper side and then no longer had a continuous ornamental surface which permitted dirt to enter easily. On the other hand, those elastic straps of this type, in which an attempt was made to overcome these disadvantages, were of a too complicated construction, and it was difficult or even impossible to take them apart, for example, in order to shorten the strap, without injuring the individual parts thereof, or then again to reassemble them without special tools and without soldering or riveting the same.

It is an object of the present invention to provide an elastic link strap which will overcome all the above-mentioned disadvantages.

The features of the present invention include the provision of connecting members in the form of brackets which are arranged in pairs in opposite relation to each other at both longitudinal sides of the strap and closing the opposite open ends of hollow tubular links, in the provision of a pair of short side arms on each bracket which are bent at a right angle toward the inside of the strap and engage in the open ends of two adjacent tubular links, thus coupling the same with each other, in the provision of an arm either on the upper or lower edge or on both edges of the back portion and of each bracket and likewise bent at a right angle toward the inside of the strap at least partly covering up the upper and/or lower sides of the tubular links when the strap is in the released position, in the provision of covering plates on either the upper or lower side or on both sides of the strap and removably connecting the upper and/or lower arms of two opposite brackets. In those embodiments of the invention in which the connecting brackets are provided with both upper and lower arms and are connected to upper and lower covering plates, these brackets and plates together form a plurality of parallel, substantially rectangular casings with open sides extending transverse to the longitudinal direction of the strap, and disposed in engagement with each other when the strap is in the released position. Since in such position each pair of these casings fully encloses the intermediate tubular link including the open ends thereof, and since in any position of the new strap these casings form its outer and most apparent elements, as well as the arm-engaging surface and at least the principal part of the upper ornamental surface, they are to be regarded and will subsequently be referred to as the main links of the strap. Due to such construction, the new strap is not only completely enclosed on all sides and of unitary appearance when in the released position, but both its upper ornamental surface and lower arm-engaging surface form a continuous surface uninterrupted by any gaps.

The covering plates forming the principal part of these outer surfaces of the strap are preferably connected to the upper and/or lower arms of the connecting brackets so as to be easily disassembled from each other. According to the invention, this may be done in a simple manner by bending the lateral edges of the covering plates over into a U-shape so that they may then be slipped over the upper or lower arms of the opposite connecting brackets from one longitudinal side of the strap, or vice versa, that the brackets may then be inserted into the opposite open ends of the covering plates. If desired, the upper and/or lower arms of the connecting brackets may be inwardly curved so that these curved portions will engage with the upper or lower sides of the tubular links and slide along these sides when the strap is being expanded or contracted.

In order to prevent the connecting brackets from slipping out of the open ends of the U-shaped covering plates, and to insure a firm connection between the brackets and covering plates without relying entirely upon the friction between these elements, the upper or lower arms may be provided with apertures or recesses in which suitable pressed-in projections or knobs on the covering plates are adapted to engage. These knobs may either be pressed into the covering plates during the manufacture thereof or they may be provided after the different elements of the strap have been assembled. In place of such pressed-in knobs, such knobs may also be applied to the inner sides of the covering plates so as to avoid any pressed in dents on the outside of these plates. Furthermore, the lower covering plates are preferably provided with a substantially central aperture so as to permit the insertion of a small tool such as a pin, nail, or knife point, for pressing the connecting brackets toward the outside and for thus facilitating the disassembly or removal of individual links from the strap.

Another feature of the invention consists in including the lower lateral edges of the back portions of the connecting brackets and in making the lower arms thereof as well as the lower covering plates thereon of a narrower width than the respective upper arms and covering plates, so that a gap will remain between the lateral edges of the lower covering plates of adjacent links even when the strap is in the released position, and the skin or hairs on the arm of the wearer of the strap cannot be caught between these edges.

As already indicated, the invention may also consist in the provision of only one upper or lower arm on the brackets of each pair and thus also of only one upper or lower covering plate removably mounted on such brackets, so that, when the strap is expanded, only the upper or lower side thereof will form a continuous closed surface, while the opposite side will have gaps between the adjacent tubular links. In such a case, either the lower sides of the tubular links opposite to the upper arms of the brackets or the upper sides of the tubular links opposite the lower arms of the brackets are made to extend beyond the open ends of the side walls of these links, and preferably to the extent of the thickness of the back portion of the brackets so that the latter will be covered by such extensions either at such lower or upper side and will also be guided thereby at the side which has no arm, and so that when the brackets are fully inserted, the outer edges of the lower side walls of the tubular links will be flush with the outer surfaces of the back portions of the brackets.

If the connecting brackets of the above-described embodiments of the invention are being pressed or pulled outwardly to disengage from their catches on the covering plates to permit a removal of one or more main links from the strap or the insertion of an additional link, and if such operation is not carried out very carefully, it may happen that the brackets will be pulled out entirely with the result that the entire main link covering the tubular link, that is, the two connecting brackets and the upper and lower covering plates, will fall apart. Consequently, the reconnection of the adjacent links would then require a complete reassembly of the various link elements.

It is a further object of the invention to provide an elastic strap with means for preventing such accidental disassembly of the link elements even during the intentional separation of adjacent links for the purpose of shortening or lengthening the strap, or for replacing a defective link.

This object may be attained principally by making one or both of the upper and lower bracket arms considerably longer than the short side arms of each bracket and particularly that side arm which extends into the adjacent link to engage with a side wall thereof. Thus, if the brackets are pulled out slightly beyond the length of the short side arms, the latter will slip out of the open ends of the tubular links so that the two adjacent links will then be separated.

Another and preferred feature of the invention for attaining this object consists in making at least the lower bracket arm longer than the side arm which extends into the adjacent tubular link, and engages with the side wall thereof and in providing this lower arm with a stamped-in tooth-like projection on its lower side, and in further providing the lower covering plate with one aperture in which such tooth will engage when the bracket is fully inserted in the covering plates, and at least one additional aperture at a certain distance from the first aperture and at one or both sides thereof, and more toward the outer end or ends of the lower covering plate. This outer aperture serves as a catch to arrest that respective bracket which is being pulled out in a certain drawn-out position relative to the tubular links. Thus, in this position the bracket will still remain attached to the covering plates but its short side arm will disengage from the adjacent tubular link. The distance between the two apertures toward one end of each lower covering plate should therefore be slightly larger than the length of the connecting side arm of the bracket. Thus, if one or both brackets of each pair are locked in such drawn-out position on the lower covering plate, the adjacent links may be easily separated from each other without danger that the main links consisting of the two connecting brackets and the upper and lower covering plates will fall apart during such separation or removal of the individual links. If the tooth on the lower bracket arm is then pressed inwardly by the insertion of a pointed instrument into the more central aperture in the lower covering plate in which the bracket is arrested in its fully inserted position, and if, at the same time, the bracket is pulled or pressed outwardly the tooth will slide over the solid portion of the lower covering plate intermediate the two apertures and then automatically engage in the outer aperture, and prevent the bracket from being pulled out any further, so that the respective side arm of the bracket may then be slipped out of the tube connecting the two adjacent main links. An accidental disassembly of the entire links or covering members will thus be safely avoided.

For accomplishing this purpose of the invention, namely, to separate the individual links of the strap from each other without taking each link apart and disassembling it into its individual elements, and for doing this by pulling out at least one of the two connecting brackets of each pair toward one side of the strap until it again catches in another notch or aperture and is thus prevented from being further pulled out, the present invention further provides that the side arms of each connecting bracket which are bent inwardly to engage into the open ends of two adjacent tubular links are made of two different lengths. The two opposite shorter side arms of each pair of brackets then engage against the inner surface of the side wall of one tubular link, while the two opposite longer side arms of the two brackets engage behind the spring in the adjacent tubular link. When one or both brackets are then pulled out and locked in their extended position, the shorter side arms are likewise withdrawn from the adjacent tubular link, so that the connection between the adjacent main links will thus be severed although the brackets remain on the covering plates and in engagement with the springs.

In order to increase the resiliency of the lower arms of the brackets to insure a proper locking action of their small toothlike projections in the apertures in the lower covering plates, the end portion of each lower arm carrying the projection is preferably made narrower than the portion adjacent to the back portion which also serves the function of guiding the bracket within the lower covering plate. For further increasing the spring action, this end portion is preferably bent so as to be inwardly offset with respect to the mentioned guiding portion at the point where it merges therewith, and from such offset toward its free end which carries the toothlike projection, the arm is bent in the outward direction. If the free end of the arm is then pressed inwardly and out of engagement with the central aperture in the lower covering plate, and the respective bracket is then pushed or pulled outwardly, this tooth will then automatically catch in the outer aperture and prevent the bracket from being pulled out entirely.

The toothlike projection on the free end of the lower bracket arm is further inclined toward said end so that, when the bracket is being inserted into the lower covering plate, or pushed inwardly from its engagement in the outer aperture thereof, this projection can slide out of the outer aperture toward the central aperture and into locking engagement therewith. The other side of such tooth facing toward the wider guiding portion of the lower bracket arm is, however, shaped so as to interlock with the outer edge of each aperture and to permit its disengagement therefrom only if the spring portion of the lower arm is pressed inwardly.

According to a preferred embodiment of the invention, the shorter side arm of each connecting bracket is made of such a length that only one of the two opposite brackets has to be partly pulled out of the covering plates in order to separate the adjacent links from each other. In such event, only that side of the lower covering plate from which the bracket is to be pulled outwardly has to be provided with both an inner and an outer aperture, while the other bracket only needs to engage in one aperture or may even be rigidly connected to the lower plate. The inner aperture for locking the bracket which is to be pulled out in its fully inserted position is preferably made so large as to permit the insertion of a pin or pointed tool to press the free end of the spring portion inwardly for disengaging its tooth, while the free end of the spring portion of the other bracket which is not to be pulled out may be covered by the lower plate, thus making the removal of the latter bracket which is not secured by an outer catch rather difficult and rendering the entire separating operation practically foolproof.

The spring to be provided within each tubular link may be a flattened coil spring, one side of which engages against one side wall of the tubular link, while the other side engages against one arm of each of the two opposite brackets. However, according to a more preferred embodiment of the invention, the springs are made in the form of curved leaf springs since such springs allow a larger expansion of the strap, have a better spring action and do not tire as easily as the flattened coil springs above described. Each tubular sleeve link is preferably provided with three of such leaf springs which are curved in opposite directions to each other so that the ends of two springs face toward each other and the curved center of one of these springs engages against one side of the tubular link, while the curved center of the other spring engages against the curved center of the third spring, the free ends of which engage against the inner side of the longer side arm of each of the two opposite brackets which extends into the open ends of the tube. The central one of these three springs is preferably made longer than the two others and its ends are bent over the ends of the outer spring facing it. The side wall of the tubular link facing toward the bent-over ends of the central spring may further be notched out at both ends to permit these spring ends to pass into or through these notches when the strap is considerably expanded. This spring arrangement thus permits the strap to be expanded to such an extent that the three springs in each tubular link rest perfectly flat upon each other.

The advantages of the elastic strap according to this invention over similar straps previously designed consist especially in its simple and inexpensive manufacture, avoiding all riveting, soldering and the like, and in the fact that it is not only of beautiful shape and design but that both in its released and expanded positions, it will always give the optical impression of a uniform, continuous, and fully enclosed strap. This strap allows the largest possible expansion; it rests smoothly and flexibly on the arm of the wearer; and its interior is protected from the entry of any dirt. Furthermore, it is of light weight and may be taken apart at any desired point without the least possibility of any damage to its elements or appearance and without requiring the individual links to be disassembled. After being lengthened or shortened, or after one or more links have been exchanged, it can also be put together again in a very simple manner and without any special tools. The individual parts of the strap may be made of precious or nonprecious metals or their alloys, and partly even of synthetic materials.

The tubular links may be of a simple shape, preferably of rectangular cross section and with open ends. They may either be seamless or be bent into their angularly tubular shape from a flat piece of material, and if the latter, they are preferably inserted in the strap so that their edges or seams are disposed at the lower side so as not to be visible. The springs within the tubular links may either be flattened coil springs or curved leaf springs, as above described. However, any other suitable type of springs, for example, angular springs, may also be used.

Further objects, features, and advantages of the present invention will be apparent from the following detailed description thereof, particularly when read with reference to the accompanying diagrammatical drawings of several embodiments of the invention, shown greatly enlarged and partly in cross section in which—

Fig. 1 shows a plan view of a portion of the new strap according to a first embodiment of the invention and in the contracted or released position;

Fig. 2 shows a plan view of the same strap in the expanded position;

Fig. 3 shows an end view of the narrow longitudinal side of the strap according to Fig. 1 in the released position;

Fig. 4 shows an end view similar to Fig. 3 but with the strap in the expanded position;

Fig. 5 shows a cross section of the strap according to Fig. 1 taken in a direction transverse to the longitudinal direction of the strap and through one assembled link;

Fig. 6 shows a bottom view of the individual assembled links as shown in Fig. 5;

Fig. 7 shows a plan view of a portion of the new strap according to a second embodiment of the invention in the released position;

Fig. 8 shows an end view similar to Fig. 3 of the second embodiment;

Fig. 9 shows a view similar to Fig. 5 of the embodiment according to Figs. 7 and 8;

Fig. 10 shows a bottom view of the strap according to Figs. 7 to 9;

Fig. 15 shows a perspective view of the upper covering plate of a main link according to Figs. 11 to 14;

Fig. 16 shows a perspective view of a tubular link according to Figs. 11 to 14;

Fig. 17 shows a perspective view of the lower covering plate of a main link according to Figs. 11 to 14;

Fig. 18 shows a perspective view of a connecting bracket;

Fig. 19 shows a perspective view of the spring assembly employed; while

Fig. 20 illustrates the manner of separating two adjacent links of a strap according to the invention.

Figure 11:
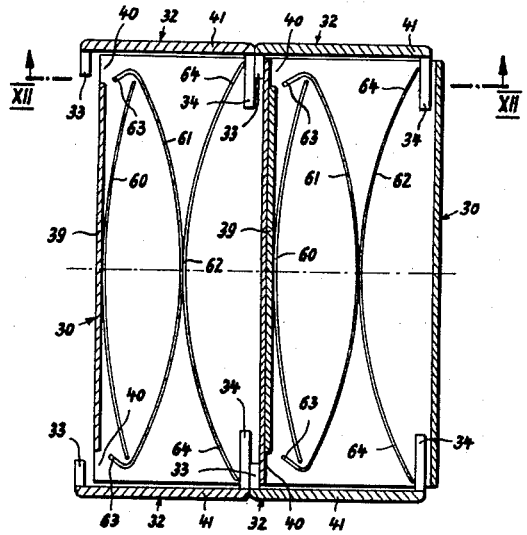
Fig. 11 shows a cross section of a third embodiment of the invention, in a view similar to Fig. 1.
Figure 12:
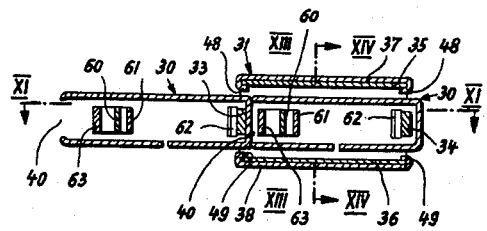
Fig. 12 shows a cross section taken along line XII—XII of Fig. 11.

Referring to the drawings, and first particularly to Figs. 1 to 6, the new elastic strap consists generally of a plurality of main links 1, each of which is composed of a plurality of elements, and which are connected with each other by tubular links 2. Each tubular link 2 consists of an upper wall 7, a lower wall 8, and side walls 6, and has open ends 5. The line of engagement of the two parts of the lower wall 8 is indicated at 9. Each tubular link 2 contains a coil spring 3 of a flat angular shape so as to comply substantially with the shape of such link. Each of the main links 1 is composed of a pair of brackets 4, each of which consists of a back portion 26 with short side arms 11 and 12 extending therefrom at a right angle and into the open ends 5 of two adjacent tubular links 2. Arm 12 engages within one sleeve link 2 with one side wall 6 thereof, while arm 11 engages within the adjacent tubular link behind a coil spring 3, the other end of which rests against the opposite side wall 6 of such tubular link. Back portion 26 of each bracket 4 further carries an upper and lower arm 13 and 14 which are preferably of greater length than side arms 11 and 12 and of slightly narrower width than the back portion. They are likewise bent at a right angle toward the inside of the strap and at least partly cover up both the upper and lower walls 7 and 8 of tubular links 2. Arms 13 and 14 of two opposite brackets 4 are removably connected with each other by an upper cover plate 15 and a bottom plate 16, respectively. For this purpose, the lateral edges of arms 13 and 14 form outwardly crimped edge portions 25 which are slipped into the ends of the U-shaped side portions 18 and 19 on the cover bottom plates 15 and 16, respectively. The central parts of the upper and lower arms 13 and 14 are thus bent inwardly at 17 relative to the edge portions 25, and substantially engage with the upper and lower walls 7 and 8 of tubular links 2, respectively, when the strap is in the released position, or they slide along the latter when the strap is being expanded.

In the embodiment of the invention as shown in Figs. 3 and 4, the back portions 26 of brackets 4 have inclined lower edges 20 so that the lower arms 14 and the bottom plates 16 which are slipped thereon are of narrower width than the upper arms 13 and the cover plates 15. Thus, when the strap is in the released position as shown in Fig. 3, the bottom plates 16 of the adjacent main links 1 will be separated by gaps 21 to prevent the skin or hairs on the arm of the person wearing the strap from being caught between the links.

Figs. 5 and 6 show a modification of the invention in which the lower arms 14 of brackets 4 are extended and provided with apertures 23, while each bottom plate 16 has indentations pressed into the same which, on the inner side, form bulges 24 which snap into and engage in apertures 23 when the brackets are slipped into the opposite ends of plate 16. Bottom plates 16 are preferably also provided with substantially central apertures 22, through which a suitable tool may be inserted to push against the ends of the lower arms 14 to displace brackets 4 in the outward direction sufficiently to disengage side arms 12 from the adjacent tubular link.

Figs. 8 and 9 show another modification of the invention, in which the lower arms and bottom plates, as shown in Figs. 3 and 4 at 14 and 16, respectively, have been omitted. The lower wall 8 of each tubular link 2 should then extend beyond the ends of the other walls thereof by the thickness of the back portions 26 of brackets 4, as shown in Fig. 9 at 10, whereby the lower sides of these back portions 26 will be covered and guided. Obviously, the strap may also be designed in the opposite manner by omitting the upper arms of brackets 4 and the cover plates and by only providing lower arms and bottom plates.

Figs. 11 to 20 illustrate two further embodiments of the invention in which the individual links of the elastic strap again consist of a hollow tubular link 30 and of main links generally indicated at 31 which, in turn, are composed of a pair of connecting brackets 32 with side arms 33 and 34 and upper and lower arms 35 and 36 which are slipped into the U-shaped cover plate 37 and into a slightly narrower bottom plate 38.

Tubes 30 have open ends and are preferably bent into a rectangular shape from a single piece of material in which one narrow side wall 39 is notched out at both ends at 40, as shown particularly in Fig. 16.

Figure 13:
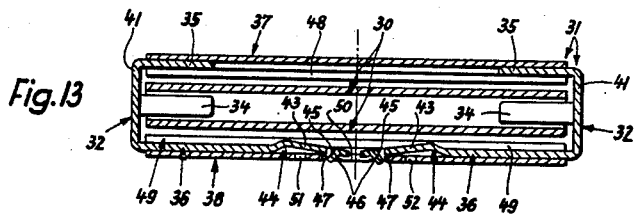
Fig. 13 shows a cross section taken along line XIII—XIII of Fig. 12.
Figure 14:
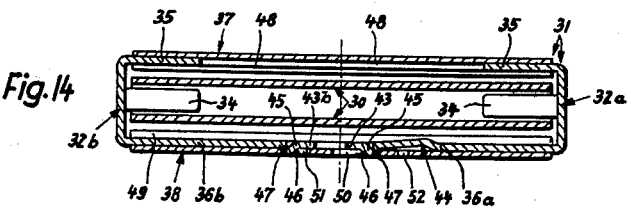
Fig. 14 shows a cross section taken along line XIV—XIV of Fig. 12, but illustrating a further modification of the invention.

Each connecting bracket 32 as shown particularly in Fig. 18, is made likewise of a single piece of material which consists of a back portion 41, which in the assembled strap forms a portion of the longitudinal sides thereof, and from which arms 33, 34, 35, and 36 all extend at a right angle in the same direction. The side arms of each bracket extend substantially centrally between the upper and lower arms 35 and 36 and consist of a short arm 33 at one side and a longer arm 34 at the other side of back portion 41. The lower arm 36 is of greater length than the other arms and is notched at both sides at 42 so that the free end 43 is of narrower width than the portion adjacent to back portion 41 which, just as the shorter upper arm 35, serves as a supporting lug which is slipped into the open ends of the cover and bottom plates 37 and 38, respectively. Due to recesses 42, the free end 43 of the lower arm 36 is of narrower width and forms a leaf spring. Furthermore, as shown in Figs. 13 and 14, at the point where the narrow spring end 43 merges with the wider plate-supporting portion of the lower arm 36, the latter is slightly bent transversely at 44 so as to increase the spring action of the free end portion 43. This portion is also punched-in centrally from above so as to form a small tooth 45 with an inclined lower surface 46 and a rear edge 47 extending substantially at a right angle to the lower surface of arm 36.

Cover plate 37 and bottom plate 38, shown particularly in Figs. 15 to 17, respectively, have substantially U-shaped side portions 48 and 49, respectively, into which arms 35 and 36 of brackets 32 are to be slipped, as previously described. The inner width between the opposite portions 48 and 49 of each plate 37 and 38, respectively, substantially corresponds to the maximum width of arms 35 and 36 of brackets 32, while the inner width of each U-shaped portions 48 and 49 substantially corresponds to the thickness of the material of arms 35 and 36, so that these arms fit slideably between these U-shaped portions and are guided thereby.

Bottom plate 38 further has a central aperture 50 and another aperture 51 and 52 at each side thereof. When brackets 32 are being inserted into the cover and bottom plates 37 and 38, the small teeth 45 on the lower bracket arms 36 will first engage in the outer apertures 51 and 52 but will then again slide out of them because of their inclined surfaces 46 and finally snap into the central aperture 50. Brackets 32 are thus securely anchored to the cover and bottom plates 37 and 38 and can only be removed therefrom if a pin is inserted through the outer apertures 51 and 52 to bend the spring ends 43 upwardly so that the edge 47 of teeth 45 will disengage from the rear edge of apertures 50 while brackets 32 are simultaneously pulled outwardly until teeth 45 engage in the outer apertures 51. Such partial withdrawal of brackets 32 will, on the one hand, prevent an accidental removal thereof from the cover and bottom plates 37 and 38, while, on the other hand, it will be sufficient to permit the short lateral arms 33 of brackets 32 to slide out of tubes 30, so that the adjacent links of the strap can then be separated from each other while individually still being in an assembled condition. If the short arms 33 are made of the proper length, it will even suffice if only one bracket is pulled out until its tooth 45 engages in aperture 52. The two adjacent links 1 to be disconnected from each other may then be slightly pivoted relative to each other, as indicated by arrow a in Fig. 20, and one link is then slid longitudinally to the other, as indicated by arrow b, so that the short arm 33 of the opposite bracket 32 may then also be disengaged from tube 30 of the adjacent link.

If in order to separate the adjacent links, only one of the two opposite brackets 32 is to be partly pulled out at one side of plates 37 and 38, only that side of bottom plate 38 needs to be provided with two apertures 50 and 52 in which the small tooth 46 of bracket 32a is to engage, as shown in Fig. 14, that is, one aperture 50 for the fully inserted position and one aperture 52 for the partly pulled-out position, while the other side of bottom plate 38 is only provided with one aperture serving as a catch for holding bracket 32b in its fully inserted position. For this purpose, if teeth 45 of both brackets are to engage in the same larger central aperture 50, as shown in Fig. 13, aperture 51 may be omitted entirely, or, as shown in Fig. 14, the spring arm 36b of the other bracket may be made shorter so that, when the latter is fully inserted into plates 37 and 38, its tooth 45 will engage in aperture 51. The free end 43b of spring arm 36b may then be covered by bottom plate 38. To facilitate the partial withdrawal of bracket 32a, the central aperture 50 is preferably made of such length as to permit the insertion of a pointed tool to press the spring end 43 upwardly until its tooth 45 disengages from aperture 50 so that the bracket may then be pulled outwardly until tooth 45 engages in aperture 52. If bracket 32b is not to be withdrawn, it may, if desired, also be rigidly secured to plates 37 and 38 or be made an integral part of one or both plates.

In place of coil springs as provided in the tubular links of the embodiments according to Figs. 1 to 10, each of the tubular links according to Figs. 11 to 20 contains three separate leaf springs 60, 61, 62, as shown particularly in Figs. 11, 19, and 20. Spring 60 rests with its back against the narrow side wall 39 of tube 30 which terminates in the notches 40, while spring 61 extends in the opposite position thereto and its extended ends 63 are bent over to surround the ends of spring 60. The back of spring 61 rests against the back of the third spring 62, the free ends 64 of which rest against the longer lateral arms 34 of brackets 32. When the strap is being expanded, the bent-over ends 63 of spring 61 will pass into and through the notches 40 of tube 30 so that all three springs may be flattened out completely, thus permitting a very large expansion of the strap. This spring arrangement has the further advantage that the individual springs and spring portions are very uniformly tensioned at any degree of expansion of the strap. Furthermore, as compared with coil springs, such leaf springs retain their full original resiliency much longer; they are also more resistant to corrosion, and more easily and inexpensively manufactured.

While the invention has been described in detail with reference to certain now preferred examples and embodiments thereof, it will be understood by those skilled in the art that various changes and modifications may be made without departing from the spirit and scope of the invention as defined in the appended claims.

Having thus described my invention, what I claim as new is:

1. An elastic link strap comprising a plurality of tubular members adjacent to each other and extending transverse to the longitudinal direction of the strap, at least one spring disposed within each tubular member in operative engagement with one side wall thereof, connecting members substantially enclosing the ends of each tubular member, said connecting members being disposed in pairs in opposite relation to each other at the longitudinal sides of said strap, each of said connecting members having a back portion, a pair of short side arms and at least one longer arm on said back portion, said arms extending at substantially right angles to said back portion toward the inside of said strap, said side arms of each connecting member extending into the open ends of two adjacent tubular members, one of said side arms engaging with the spring in one of said tubular members so as to tension the same when the strap is expanded, the other side engaging with the side wall of the adjacent tubular member opposite the wall engaged by the spring, each such longer arm partly covering at least one outer side of the tubular member with which it is associated, and at least one covering plate movably associated with each tubular member, the longer arms and covering plate having means carried thereby for removably connecting the longer arms of the two opposite brackets of each pair with each other, said back portions of said brackets and said covering plates together forming a plurality of parallel main link casings having open sides disposed adjacent to each other and extending transversely to the longitudinal direction of said strap, said main link casings being adapted to engage each other and at least partly enclosing said tubular members when said strap is in the released position, said covering plates together with said tubular members forming a continuous outer surface when said strap is in the expanded position.

2. An elastic link strap comprising a plurality of tubular members adjacent to each other and extending transverse to the longitudinal direction of the strap, at least one spring disposed within each tubular member, and connecting members substantially enclosing the ends of each tubular member, said connecting members comprising a plurality of brackets disposed in pairs in opposite relation to each other at the longitudinal sides of said strap, each of said brackets having a back portion, a pair of short side arms and an upper and a lower arm on said back portion and extending at substantially a right angle thereto toward the inside of said strap, said side arms of each bracket extending into the open ends of two adjacent tubular members, one of said side arms engaging with said spring in one of said tubular members so as to tension the same when the strap is being expanded, the other side arm engaging with a side wall of the adjacent tubular member, said upper and lower arms at least partly covering the upper and lower sides of said tubular members, and an upper and lower covering plate connecting the upper and lower arms of the two opposite brackets of each pair with each other, at least one of said upper and lower arms of the two opposite brackets of each pair respectively and said upper and lower covering plates having means carried thereby for detachably connecting the upper and lower arms of each pair of brackets with each other, said back portions of said brackets and said upper and lower covering plates together forming a plurality of parallel main link casings having open sides and disposed adjacent to each other extending transverse to the longitudinal direction of said strap, said main link casings being adapted to engage each other and fully enclosing said tubular members when said strap is in the released position, said upper and lower covering members together with said tubular members forming continuous upper and lower surface when said strap is in the expanded position.

3. An elastic link strap as defined in claim 1, wherein each of said covering plates is provided with substantially U-shaped edges, said longer arms of two opposite brackets being adapted to slide within said U-shaped edges.

4. An elastic link strap as defined in claim 2, wherein said lower bracket arms and covering plates are narrower than said upper bracket arms and covering plates, the lateral edges of each back portion of said brackets being downwardly inclined to each other so that, even when said strap is in the fully contracted position, a gap is formed between the edges of the adjacent lower covering plates to prevent the skin and hair on the arm of the wearer of the strap from being caught between these edges.

5. An elastic link strap is defined in claim 1, wherein said longer arms of said brackets are curved inwardly between their lateral edges, said curved portions being adapted to engage with one of the outer sides of said tubular members and to slide along the same when the strap is being expanded.

6. An elastic link strap as defined in claim 1, wherein said connecting means comprise apertures in said lower arms and projections on said covering plates, said projections being adapted to engage in said apertures and to be arrested therein when said covering plates are slipped over said arms so as to prevent said brackets from separating from said plates.

7. An elastic link strap as defined in claim 2, said lower bracket arms and said lower covering plates having interlocking portions, said covering plates having substantially central apertures through which a suitable tool may be inserted to press said connecting brackets laterally outwardly to disengage them from their locked position on said lower covering plates.

8. An elastic link strap as defined in claim 1, wherein each connecting bracket of said strap has only one longer arm, one outer side of said tubular members disposed in the opposite direction to said longer bracket arm extending a certain distance beyond the ends of the other sides of said tubular members, said distance substantially corresponding to the thickness of the back portion of said brackets.

9. An elastic link strap is defined in claim 2, wherein each lower covering plate is provided with at least one aperture near the center thereof, and at least one aperture at least at one side of said central aperture and nearer to one outer end of said covering plate, said apertures being disposed within a straight line transverse to the longitudinal direction of the strap, the lower arm of each of said brackets at least at one longitudinal side of said strap thereof and substantially centrally of its width and adapted to engage in said central aperture when said upper and lower bracket arms are inserted in said upper and lower covering plates so as to lock said bracket to said lower covering plate in its fully inserted position, and when said bracket is pulled outwardly, to engage in said outer aperture to arrest said bracket in a certain extended position relative to said covering plates and to said tubular members which are enclosed by said bracket and said upper and lower covering plates, whereby at least one of the side arms of said bracket may be withdrawn from its engagement with at least one of said tubular members, while said bracket remains attached to said covering plates.

10. An elastic link strap as defined in claim 9, wherein the two side arms of said bracket which extend into the open end of two adjacent tubular members are of different lengths, the shorter side arm engaging with the inside of a side wall of one tubular member and the longer side arm engaging behind the spring in the adjacent tubular member so that when the projection on the lower arm of said bracket is disengaged from the central aperture in the lower covering member and said bracket is drawn outwardly so that said projection engages in said outer aperture, only the shorter side arm of said bracket will be withdrawn from its engagement with the side wall of the first tubular member and thus permit a separation of the adjacent links, while the longer side arm will still remain in engagement with the spring in the other tubular member.

11. An elastic link strap as defined in claim 9, wherein the covering plates have substantially U-shaped edges, the lateral edges of said upper and lower bracket arms having a width so as to serve as guides adapted to slide within said U-shaped edges and to connect said plates to said brackets, said lower bracket arm having a narrower end portion spaced from the back portion of said bracket and adapted to act as a leaf spring, said central projection being disposed on the lower side of said end portion and near the free end thereof and adapted to engage into one of said apertures under the resilient pressure of said spring portion.

12. An elastic link strap as defined in claim 11, wherein the narrower end portion of said lower bracket arm is bent at an inwardly offset relation to the wider guide portion near said back portion and at a slightly inclined angle thereto in the outward direction so as to increase the resiliency of said spring portion, whereby, when said projection on said spring portion engages in the central aperture of said lower covering plate and is then pressed inwardly and out of engagement with the locking edge of said central aperture, and the bracket is then drawn outwardly, said projection will automatically engage in the outer aperture and prevent a further outward movement of said bracket from said covering plates so that the individual parts of the main link casing consisting of at least one connecting bracket and the upper and lower covering plates will remain attached to each other during the separation of the adjacent links from each other.

13. An elastic link strap as defined in claim 11, wherein the narrower end portion of said lower bracket arm is bent at an inwardly offset relation to the wider guide portion near said back portion and at a slightly inclined angle thereto in the outward direction so as to increase the resiliency of said spring action, said projection on said spring portion having an inclined surface toward the free outer end of said arm so as to permit said projection to slide easily out of its engagement in the outer aperture and then to snap under the spring pressure of said lower arm into engagement with the central aperture when said bracket is pressed inwardly, said projection on its opposite side forming a tooth adapted to engage with the locking edge of either of said apertures and to be disengaged therefrom only if said lower arm is pressed inwardly against its spring pressure.

14. An elastic link strap as defined in claim 10, wherein the upper and lower covering plates of each main link casing are connected with each other by two connecting brackets, the shorter side arms of said brackets being of a length so as to permit the adjacent links to be disconnected from each other by merely withdrawing one of said brackets to its extended position relative to said tubular members.

15. An elastic link strap as defined in claim 10, wherein the upper and lower covering plates of each main link casing are connected with each other by two connecting brackets, the shorter side arms of said brackets being of a length so as to permit the adjacent links to be disconnected from each other by merely withdrawing one of said brackets to its extended position relative to said tubular members, the projection on the bracket which is to be partly pulled out of said covering plates to disengage from one of said tubular members being adapted to engage in two different apertures in the lower covering plate, said lower covering plate having only one aperture for the engagement of the projection on the other connecting bracket when in its fully inserted position.

16. An elastic link strap as defined in claim 15, wherein the central aperture for the locking engagement of the bracket which is to be pulled out is of a size so as to permit the insertion of a pointed tool to press upon the free end of the resilient lower arm of said bracket, the free end of the resilient lower arm of the other bracket being covered by the lower covering plate so as to be substantially inaccessible.

17. An elastic link strap as defined in claim 10, wherein the upper and lower covering plates of each main link casing are connected with each other by two connecting brackets, the shorter side arm of one of said brackets being of a length so as to permit the adjacent links to be disconnected from each other by merely withdrawing said last bracket to its extended position relative to said tubular members, the other bracket being integrally secured to said upper and lower covering plates.

18. An elastic link strap as defined in claim 1, wherein the springs mounted within each of said tubular members comprise three curved leaf springs, the ends of two of said springs facing each other, the curved center of one of said last springs engaging one inner side wall of one tubular member, the curved center of the other, central spring engaging with the curved center of the third spring, the outer ends of said third spring engaging upon the inner sides of two corresponding side arms of the two brackets which are inserted into the open ends of said tubular member.

19. An elastic link strap as defined in claim 18, wherein the central spring is of greater length than the two other springs and its ends are bent over inwardly and loosely around the ends of the spring facing the same so as to be loosely connected thereto.

20. An elastic link strap as defined in claim 19, wherein the side wall of said tubular member facing toward the free bent-over ends of the central spring is made shorter than the other walls thereof so as to form a recess at each end through which these spring ends may pass when the strap is being expanded, thus permitting a larger expansion of the strap.

References Cited in the file of this patent

UNITED STATES PATENTS

| | | |
|---|---|---|
| 843,888 | Giguere | Feb. 12, 1907 |
| 1,571,533 | Valcourt | Feb. 2, 1926 |